(12) United States Patent
Kasinski et al.

(10) Patent No.: US 12,428,849 B2
(45) Date of Patent: Sep. 30, 2025

(54) BRACKET

(71) Applicant: FAKRO PP Sp. z o. o., Nowy Sacz (PL)

(72) Inventors: Boguslaw Kasinski, Limanowa (PL); Bartlomiej Mos, Nawojowa (PL)

(73) Assignee: FAKRO PP Sp. z o. o., Nowy Sacz (PL)

( * ) Notice: Subject to any disclaimer, the term of this patent is extended or adjusted under 35 U.S.C. 154(b) by 163 days.

(21) Appl. No.: 18/114,281

(22) Filed: Feb. 27, 2023

(65) Prior Publication Data
US 2023/0304293 A1 Sep. 28, 2023

(30) Foreign Application Priority Data
Mar. 24, 2022 (PL) ..................................... P.440749

(51) Int. Cl.
*E04F 11/04* (2006.01)
(52) U.S. Cl.
CPC .................................... *E04F 11/04* (2013.01)
(58) Field of Classification Search
CPC ....................................................... E04F 11/04
See application file for complete search history.

(56) References Cited

U.S. PATENT DOCUMENTS

| 10,135,387 | B2* | 11/2018 | Seery .................. F24S 25/60 |
| 2008/0240884 | A1* | 10/2008 | Dahners ............... B25B 13/485 |
| | | | 411/190 |
| 2019/0063073 | A1 | 2/2019 | Woodward et al. |
| 2024/0191509 | A1* | 6/2024 | Ingalls .................... E04F 11/18 |

FOREIGN PATENT DOCUMENTS

| EP | 4249709 A1 * | 9/2023 | .............. E04F 11/04 |
| EP | 4249725 A1 * | 9/2023 | .............. E04F 11/04 |
| GB | 2028914 A  * | 3/1980 | .............. E05D 5/02 |
| PL | 220639 B1 | 11/2015 | |
| PL | 228252 B1 | 3/2018 | |

* cited by examiner

*Primary Examiner* — Babajide A Demuren
(74) *Attorney, Agent, or Firm* — Bayramoglu Law Offices LLC

(57) ABSTRACT

A bracket designed for mounting on flat panel hole is constructed out of base. Base includes plate. Plate includes at least one latching foot to seat the bracket in an assembly position in at least one hole in flat panel, and lower gap for edge of appropriate hole in flat panel is between plate and each latching foot.

20 Claims, 5 Drawing Sheets

BRACKET

CROSS REFERENCE TO THE RELATED APPLICATIONS

This application is based upon and claims priority to Polish Patent Application No. 440749, filed on Mar. 24, 2022, the entire contents of which are incorporated herein by reference.

TECHNICAL FIELD

The object of the present invention includes a bracket for mounting in a hole in a flat panel made out of a low density material, and in particular in an attic stairs hatch in order to mount it to a ladder or to mount other objects to it.

BACKGROUND

Attic stairs, where a hatch is suspended from the first segment of stairs using at least two pairs of connectors, which together with the first segment of the stairs and the hatch constitute a four-bar linkage system has been disclosed in patent PL228252B1. The connectors used to suspend the hatch are attached to it using hook brackets, and each has a bearing seat for an extension seated in the connector used to suspend the hatch. The assembly opening for this seat is covered by an insert which includes a bearing fill surface and is snap mounted in the hook connector body. The hook connector bearing seat has a pass-through opening on both sides, and the extension of the connector used to suspend the hatch terminates with a flange with a larger diameter than the diameter of the seat. This limits side movements of the extension in the hook connector by putting the extension flange or the connector used to suspend the hatch flush with one or the other side wall of the hook connector. In a closed state, the stop face of the insert covering the assembly opening to the hook connector seat, on the opposite side of the bearing fill surface, is flush with the support ridge in the body of the hook connector.

Known brackets are attached to flat panels using additional attachment means such as fastening screws, which however do not ensure adequate resistance of flat panels made out of a low density material. The present invention solves this problem through a bracket, mounted in a hole of a flat panel without additional attachment means.

SUMMARY

The essence of the present invention includes a bracket for mounting in a hole in a flat panel. The bracket includes a base with a plate with at least one latching foot. The lower gap for the hole edge in the flat panel is located between the latching foot and the plate. The bracket base is fixed in the hole using the lock. In the first embodiment, the lock includes a locking foot which fills the hole in the flat panel which holds one of the base latching feet. Once the lock is inserted into the hole, the base becomes locked and the lock and the base are attached to one another by at least one coupling or adhesive. The bracket also includes a coaxial opening in the base and the lock which the pin used to suspend other elements is inserted into. Preferably the bracket is made out of plastic.

The bracket according to the present invention does not require additional attachment means in the form of screws in order to mount it on a flat panel, and its use ensures appropriate resistance of a flat panel made out of a low density material. This makes assembly quick and straightforward.

BRIEF DESCRIPTION OF THE DRAWINGS

The illustration depicts the present invention, with given figures showing the following.

DETAILED DESCRIPTION OF THE EMBODIMENTS

Figure 1:
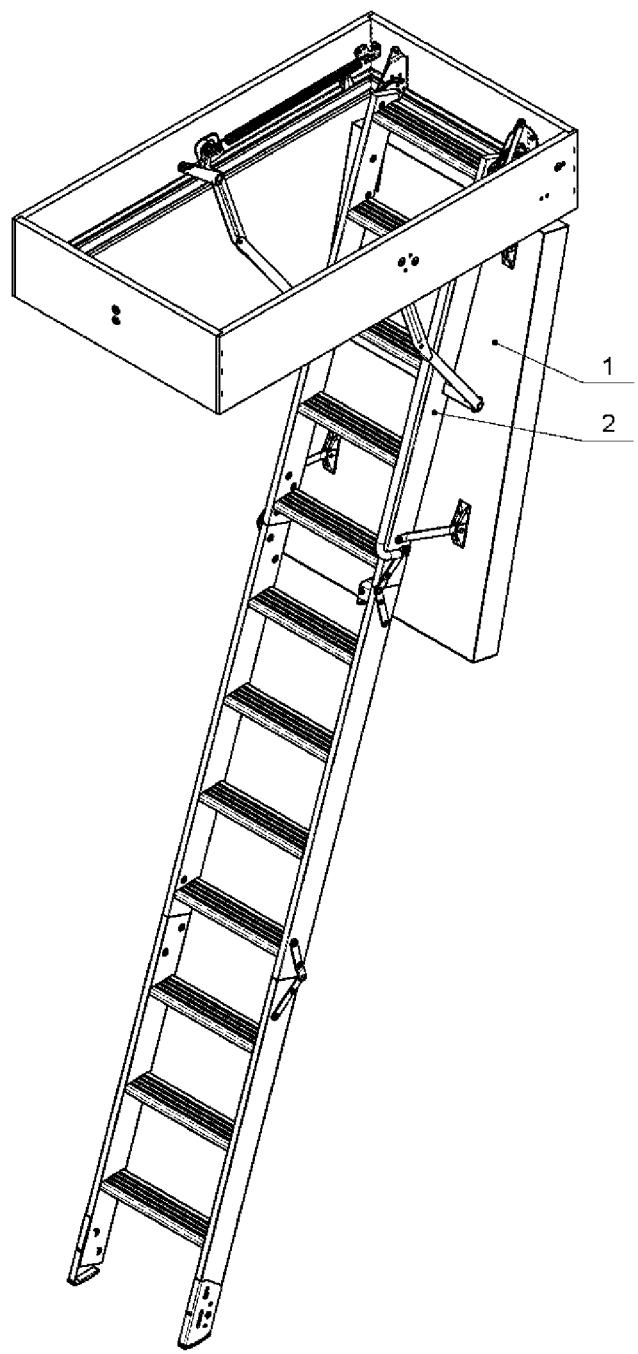
FIG. 1 is a spatial view of the attic stairs.
Figure 2A:
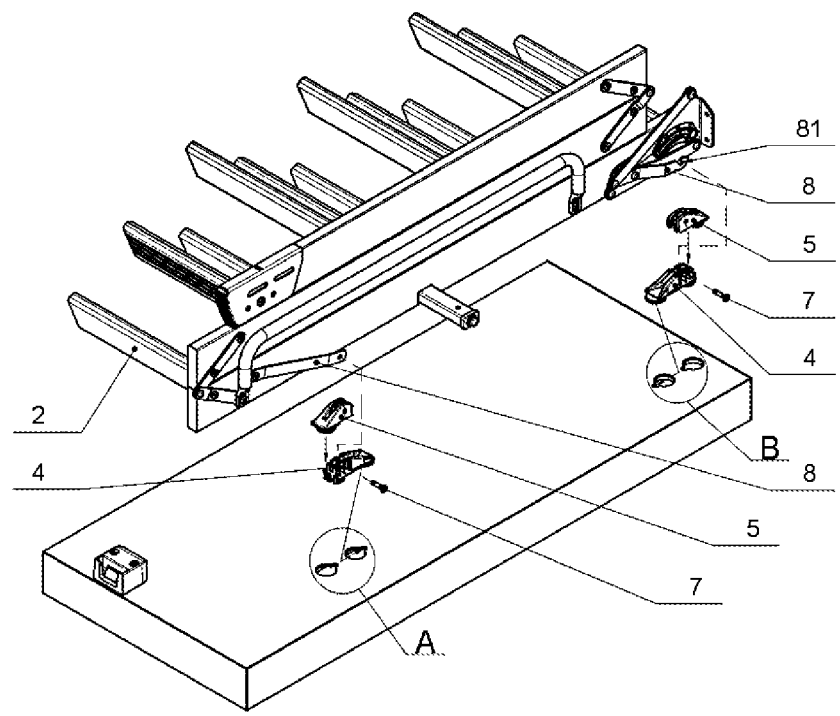
FIGS. 2A-2C show an exploded view of a ladder segment with hatch and brackets.
Figure 2B:
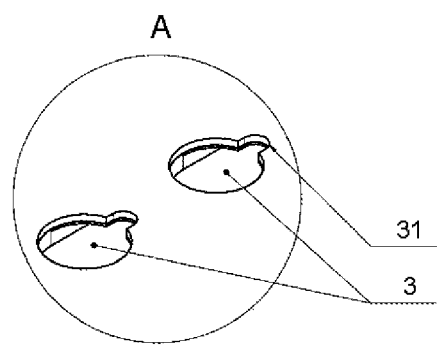
Figure 2C:
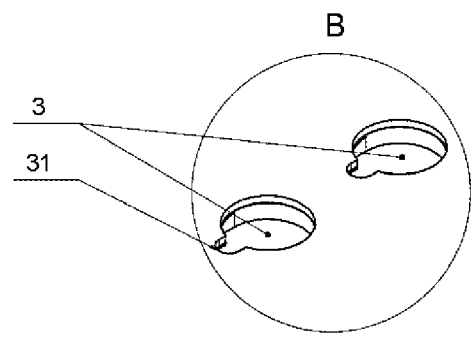
Figure 3A:
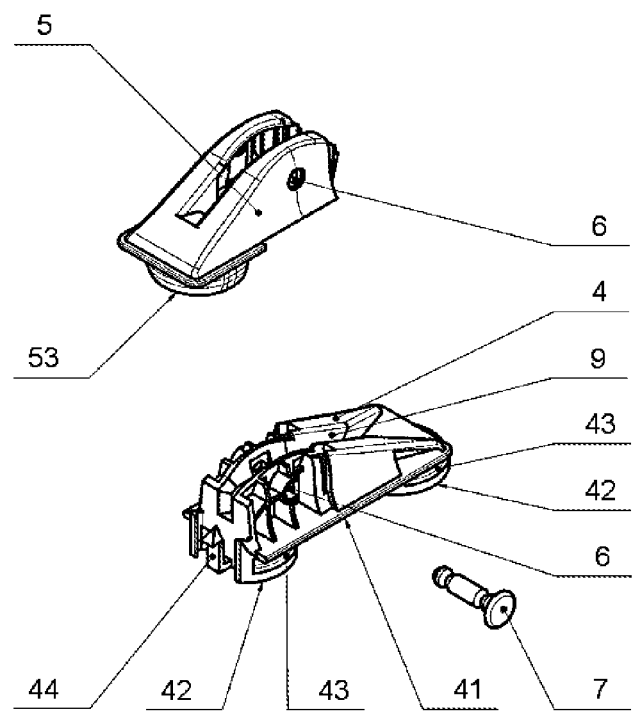
FIG. 3A is a frontal exploded view of a bracket.
Figure 3B:
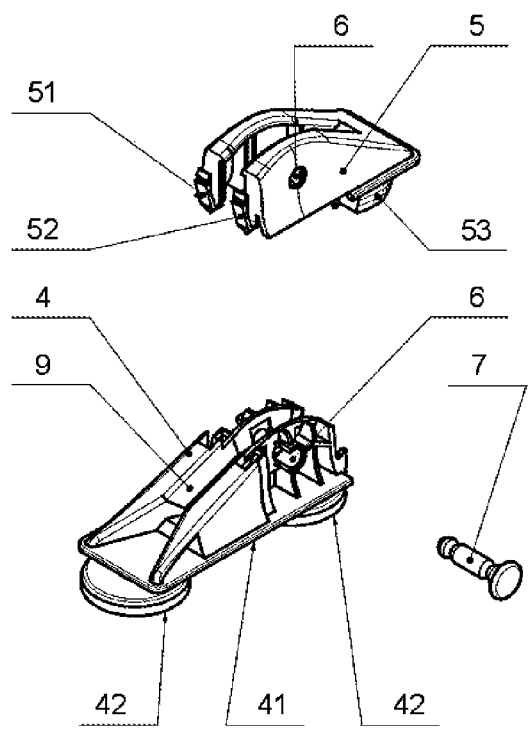
FIG. 3B is a rear exploded view of a bracket.
Figure 4:
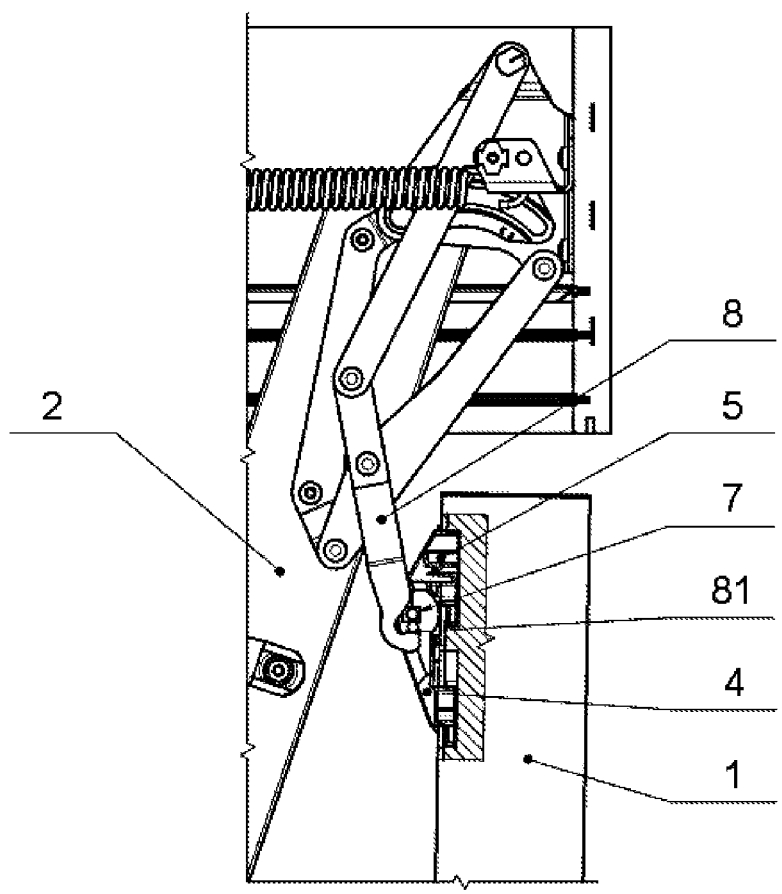
FIG. 4 shows a cross section of upper part of attic stairs with a bracket.
Figure 5:
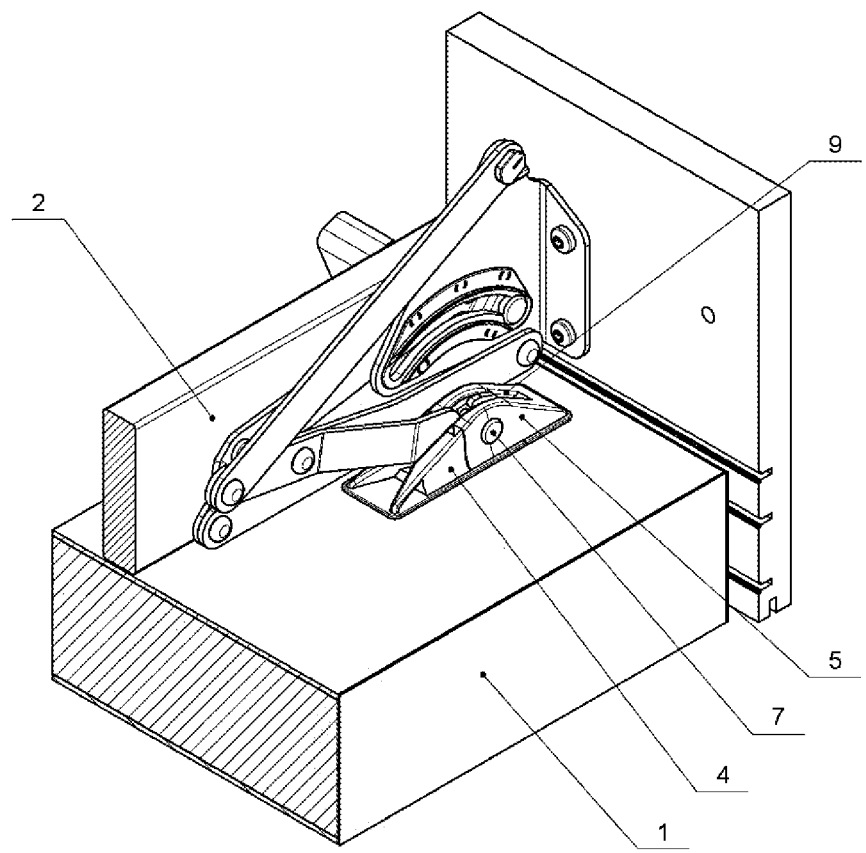
FIG. 5 shows a fragment of attic stairs with fitting and a bracket attached to the fitting.

The present invention will be presented in an embodiment of a bracket mounted in a hole of a flat panel in the form of the surface of attic stairs closing hatch 1, to which ladder segment 2 is mounted. At least one hole 3 is made in closing hatch 1 for the bracket. The bracket is constructed out of base 4 and lock 5. The base includes plate 41 with two latching feet 42 with lower gap 43 for hole 3 edge 31 located between plate 41 and each latching foot 42. Bracket lock 5 fills hole 3 with bracket base 4 already inserted. Both base 4 and lock 5 include shaped faces, which ensure lock 5 is guided during assembly into the correct position in base 4. Lock 5 also includes couplings 51, 52, and base 4 includes coupling 44. During lock insertion into hole 3 they flex, and in base 4 locked position they are flush with appropriate base 4 and lock 5 surfaces fixing the bracket in hole 3. In the bracket assembled position, base 4 and lock 5 have a working section in the form of a coaxial hole 6 for pin 7. Closing hatch 1 is to be suspended on said pin 7. To that end, closing hatch 1 includes at least two brackets and attic stairs fittings include at least one flat bar 8 terminating with hook 81, inserted into gap 9 of the bracket, wherein pin 7 is perpendicular to the longitudinal direction of said gap 9.

What is claimed is:

1. A bracket designed for mounting on a flat panel hole, comprising a base and the base comprises a plate, wherein the plate comprises two latching feet on opposite ends of the plate to seat the bracket in an assembly position in at least one hole in a flat panel, wherein a lower gap for an edge of an appropriate hole in the flat panel is between the plate and each latching foot, wherein the base is positioned between a lock and the edge.

2. The bracket according to claim 1, wherein the bracket comprises a lock of the base, wherein the bracket is in a locked position when the lock and the base are attached to one another.

3. The bracket according to claim 1, wherein the lock comprises a locking foot, the locking foot fills the at least one hole in the flat panel, wherein the at least one hole holds one of the two latching feet, locking the base in place in a locked position.

4. The bracket according to claim 1, wherein the lock and the base are attached to one another using at least one coupling.

5. The bracket according to claim 1, wherein the lock and the base are attached to one another using an adhesive.

6. The bracket according to claim 1, wherein the bracket comprises a working section for suspending a different element on the bracket.

7. The bracket according to claim 6, wherein the working section comprises a coaxial hole in the base and a lock for a pin.

8. The bracket according to claim 1, wherein the base and the lock are made out of plastic.

9. The bracket according to claim 2, wherein the lock comprises a locking foot, the locking foot fills the at least one hole in the flat panel, wherein the at least one hole holds one of the two latching feet, locking the base in place in the locked position.

10. The bracket according to claim 2, wherein the lock and the base are attached to one another using at least one coupling.

11. The bracket according to claim 3, wherein the lock and the base are attached to one another using at least one coupling.

12. The bracket according to claim 2, wherein the lock and the base are attached to one another using an adhesive.

13. The bracket according to claim 3, wherein the lock and the base are attached to one another using an adhesive.

14. The bracket according to claim 2, wherein the bracket comprises a working section for suspending a different element on the bracket.

15. The bracket according to claim 3, wherein the bracket comprises a working section for suspending a different element on the bracket.

16. The bracket according to claim 4, wherein the bracket comprises a working section for suspending a different element on the bracket.

17. The bracket according to claim 5, wherein the bracket comprises a working section for suspending a different element on the bracket.

18. The bracket according to claim 2, wherein the base and the lock are made out of plastic.

19. The bracket according to claim 3, wherein the base and the lock are made out of plastic.

20. The bracket according to claim 4, wherein the base and the lock are made out of plastic.

* * * * *